(12) United States Patent
Chen et al.

(10) Patent No.: US 11,587,210 B1
(45) Date of Patent: Feb. 21, 2023

(54) TRANSFER LEARNING FOR VISUAL SEMANTIC INFORMATION TASKS ON CURVILINEAR IMAGES

(71) Applicant: Meta Platforms Technologies, LLC, Menlo Park, CA (US)

(72) Inventors: Yu Fan Chen, Redmond, WA (US); Kiran Kumar Somasundaram, Bellevue, WA (US); Steven John Lovegrove, Woodinville, WA (US); Yujun Shen, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 213 days.

(21) Appl. No.: 16/816,023

(22) Filed: Mar. 11, 2020

(51) Int. Cl.
*G06T 5/00* (2006.01)
*G06T 7/11* (2017.01)
*G06N 20/00* (2019.01)
*G06T 3/00* (2006.01)
*G06T 7/80* (2017.01)

(52) U.S. Cl.
CPC ............. *G06T 5/006* (2013.01); *G06N 20/00* (2019.01); *G06T 3/0018* (2013.01); *G06T 7/11* (2017.01); *G06T 7/80* (2017.01)

(58) Field of Classification Search
CPC ... G06T 5/006; G06T 7/80; G06T 7/11; G06T 3/0018; G06N 20/00
See application file for complete search history.

(56) References Cited

U.S. PATENT DOCUMENTS

2020/0202498 A1* 6/2020 Raduta ................. G06T 3/0018

OTHER PUBLICATIONS

Li, Mingyang, et al. "3d room reconstruction from a single fisheye image." 2019 International Joint Conference on Neural Networks (IJCNN). IEEE, 2019. (Year: 2019).*
Mikhisor, Maria, et al. "The integral image method for fisheye images." 2013 28th International Conference on Image and Vision Computing New Zealand (IVCNZ 2013). IEEE, 2013. (Year: 2013).*
Yang, Kailun, et al. "Pass: Panoramic annular semantic segmentation." IEEE Transactions on Intelligent Transportation Systems 21.10 (2019): 4171-4185. (Year: 2019).*
Blott, Gregor, Masato Takami, and Christian Heipke. "Semantic Segmentation of Fisheye Images." European Conference on Computer Vision. Springer, Cham, 2018. (Year: 2018).*

* cited by examiner

*Primary Examiner* — Vu Le
*Assistant Examiner* — Tracy Mangialaschi
(74) *Attorney, Agent, or Firm* — Baker Botts L.L.P.

(57) ABSTRACT

In one embodiment, a method includes a computer system accessing a curvilinear image captured using a camera lens, generating multiple rectilinear images from the curvilinear image based at least in part on one or more calibration parameters associated with the camera lens, identifying semantic information in one or more of the rectilinear images by processing each of the multiple rectilinear images using a machine-learning model configured to identify semantic information in rectilinear images, and identifying semantic information in the curvilinear image based on the identified semantic information in the one or more rectilinear images.

17 Claims, 7 Drawing Sheets
(4 of 7 Drawing Sheet(s) Filed in Color)

130

140

110

120

TRANSFER LEARNING FOR VISUAL SEMANTIC INFORMATION TASKS ON CURVILINEAR IMAGES

TECHNICAL FIELD

This disclosure generally relates to the field of computer graphics processing, and in particular relates to identifying semantic information in curvilinear images.

BACKGROUND

Computer vision is a field of computer graphics processing which utilizes machine-learning models to automatically process images and videos to detect semantic information associated with content appearing within the images and videos (e.g., object instances, semantic labels, spatial arrangements, object characteristics, and contextual object relationships). In general, machine learning typically involves processing a training data set in accordance with a machine-learning model and updating the model based on a training algorithm so that it progressively "learns" the features in the data set that are predictive of the desired outputs. One example of a machine-learning model is a neural network, which is a network of interconnected nodes. Groups of nodes may be arranged in layers. The first layer of the network that takes in input data may be referred to as the input layer, and the last layer that outputs data from the network may be referred to as the output layer. There may be any number of internal hidden layers that map the nodes in the input layer to the nodes in the output layer. In a feed-forward neural network, the outputs of the nodes in each layer—with the exception of the output layer—are configured to feed forward into the nodes in the subsequent layer.

Machine-learning models may be trained to recognize object features that have been captured in images. Such models, however, are typically large and require many operations. While large and complex models may perform adequately on high-end computers with fast processors (e.g., multiple central processing units ("CPUs") and/or graphics processing units ("GPUs")) and large memories (e.g., random access memory ("RAM") and/or cache), such models may not be operable on computing devices that have much less capable hardware resources. The problem is exacerbated further by applications that require near real-time results from the model (e.g., 10, 20, or 30 frames per second), such as augmented reality applications that dynamically adjust computer-generated components based on features detected in live video.

SUMMARY OF PARTICULAR EMBODIMENTS

Identifying semantic information in photographic images and videos is a fundamental task in the field of computer vision. For example, computer vision tasks such as object detection and semantic segmentation enable machines to visually localize and identify objects. Machine-learning models are often trained on annotated image datasets to perform semantic information identification tasks (e.g., object detection, semantic segmentation). Recent advances in deep learning technology and the availability of large-scale annotated datasets of rectilinear images have significantly improved the accuracy with which existing machine-learning models can identify semantic information in rectilinear images. However, identifying semantic information continues to be a critical problem in computer vision applications reliant on non-rectilinear or curvilinear images.

Embodiments described herein relate to a transfer learning process which accurately identifies semantic information in curvilinear images captured by cameras with large fields of view (FOV), such as fisheye lens cameras. Semantic information identified in curvilinear images using this process may be used to train existing machine-learning models to accurately identify semantic information directly within curvilinear images.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application

DESCRIPTION OF EXAMPLE EMBODIMENTS

Figure 1:
FIG. 1 illustrates example semantic information identified in a rectilinear image compared to a curvilinear image.
Figure 1:
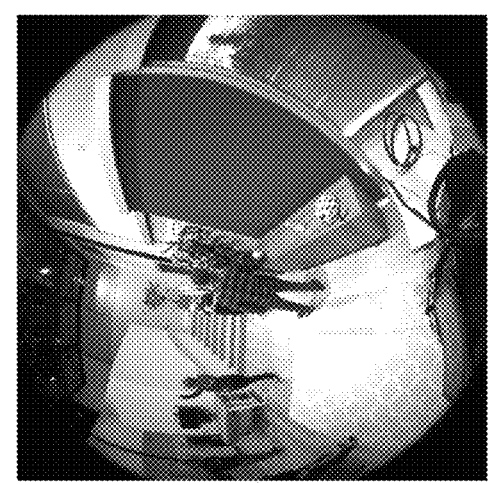
Figure 1:
Figure 1:
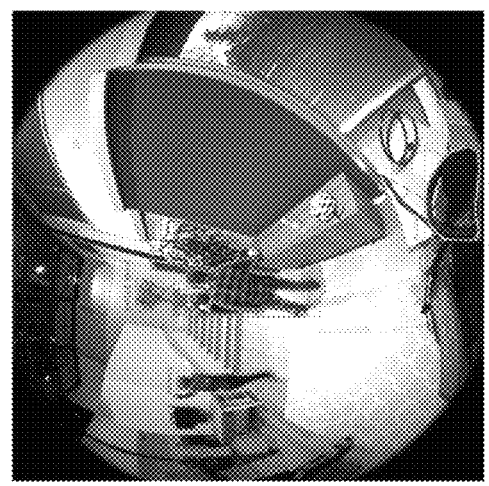

Identifying semantic information in photographic images and video is a fundamental task in the field of computer vision. For example, computer vision tasks such as object detection and semantic segmentation enable machines to visually localize and identify objects. Machine-learning models are often trained on annotated image datasets to perform semantic information identification tasks (e.g., object detection, semantic segmentation). Recent advances in deep learning technology and the availability of large-scale annotated datasets of rectilinear images (e.g., the Common Objects in Context (COCO) dataset), have significantly improved the accuracy with which existing machine-learning models can identify semantic information in rectilinear images. However, identifying semantic information continues to be a critical problem in computer vision applications such as virtual reality (VR), augmented reality (AR), mixed reality (MR), robotics, autonomous driving, and other applications implementing visual simultaneous localization and mapping (SLAM) techniques. Additional information related to deep learning techniques can be found in U.S. patent application Ser. No. 15/922,734, filed 15 Mar. 2018, U.S. patent application Ser. No. 15/971,930, filed 4 May 2018, U.S. patent application Ser. No. 15/971,997, filed 4 May 2018, U.S. patent application Ser. No. 15/972,035, filed 4 May 2018, U.S. patent application Ser. No. 16/236,877, filed 31 Dec. 2018, and U.S. patent application Ser. No. 16/236,974, filed 31, December 2018, each of which is incorporated by reference.

Embodiments described herein relate to a transfer learning process which accurately identifies semantic information in curvilinear images captured by cameras with large fields of view (FOV), which is then used to train existing machine-learning models to accurately identify semantic information directly within curvilinear images. A motivating example for this invention is the need to perform computer vision tasks in applications reliant on fisheye lenses (e.g., AR/VR systems). Due to the lack of large-scale annotated curvilinear training datasets, training machine-learning models on pre-annotated curvilinear images may be impractical and prohibitively expensive. As such, it is desirable to utilize and adapt existing pre-trained machine-learning models to identify semantic information within curvilinear images. However, conventional machine-learning models are typically trained on rectilinear images captured by camera lenses having a small FOV (e.g., ~60 degrees). Rectilinear images generally have minimal distortion and are often captured in color. In contrast, curvilinear images are typically captured by camera lenses having a much larger FOV (e.g., ~180 degrees). Curvilinear images generally have substantial distortion and are often captured in gray-scale. As a result, for a given image captured by both a conventional rectilinear camera and a fisheye lens camera, there is a substantial domain gap (i.e., shift in the relationship between data collected across different domains) between the resulting rectilinear and curvilinear images. This domain gap causes conventional machine-learning models pre-trained on rectilinear images to perform poorly when applied directly to curvilinear images. Thus, there is a need to align the critical computer vision tasks with curvilinear image datasets by accounting for this domain gap while utilizing conventional pre-trained machine-learning models to identify semantic information in the curvilinear images.

The current invention leverages the availability of known calibration parameters (e.g., focal length, distortion values) of large FOV camera lenses. In particular embodiments, calibration parameters of a large FOV camera lens may be used to generate multiple rectified rectilinear images from a curvilinear image captured by the lens. A pre-trained machine-learning model trained using rectilinear images may then identify semantic information in each rectified image. In particular embodiments, the pre-trained machine-learning model may also directly identify semantic information within the original curvilinear image. In particular embodiments, a semantic fusion algorithm may then be applied to the semantic information identified in the rectilinear images. The resulting semantic information may then be transferred into the original curvilinear image to generate an annotated curvilinear image. This process may be repeated with multiple curvilinear images to generate an annotated dataset of curvilinear images, each of which may be used to train a machine-learning model to more accurately identify semantic information directly within curvilinear images. In particular embodiments, federated learning techniques may be used to implement this process directly on client devices in order to protect user privacy. Experimental results indicate that this training process may significantly improve model performance on curvilinear images relative to conventional model training techniques (e.g., ~23% rise in mean average precision for both object detection and semantic segmentation). The results also indicate that machine-learning models trained with this process may achieve appreciable accuracy relative to rectilinear model performance on comparable datasets.

FIG. 1 illustrates example semantic information identified in a rectilinear image compared to a curvilinear image. Image 110 is a rectilinear color photograph of a room captured by a typical small FOV camera lens. Image 120 is a curvilinear gray-scale photograph captured by a fisheye camera lens in the same position and angle as the camera which captured rectilinear image 110. Various individuals and items within the room (e.g., a chair, a dining table, and a potted plant) are visible in both rectilinear image 110 and curvilinear image 120. However, due to the larger FOV of the fisheye camera lens, additional items (e.g., a mouse and a window) visible at the periphery of curvilinear image 120 are positioned within the captured room beyond the boundaries of what is captured in rectilinear image 110. Image 130 illustrates semantic information identified from rectilinear image 110 by a particular machine-learning model pre-trained on annotated rectilinear images. Image 140 illustrates semantic information identified from curvilinear image 120 by the same pre-trained machine-learning model. As can be observed in images 130 and 140, there are significant discrepancies between the semantic information identified in rectilinear image 130 and the semantic information identified in curvilinear image 140. For example, although semantic information is identified in curvilinear image 140 for objects which are only fully observable in curvilinear image 140 (e.g., the mouse and a second potted plant), substantially more semantic information is identified in rectilinear image 130 than in curvilinear image 140 for objects visible in both rectilinear image 130 and curvilinear image 140 (e.g., the dining table, chair, tv, and the two persons on the left side of the room). Additionally, the semantic information identified in rectilinear image 130 appears to be more accurate than the semantic information identified in curvilinear image 140, particularly for objects subject to significant distortion in curvilinear image 140. For example, the semantic information associated with the person raising their right hand fails to accurately outline the person in curvilinear image 140. Thus, FIG. 1 illustrates the need to train machine-learning models to more accurately identify semantic information directly within curvilinear images, particularly near the peripheral boundary where there is substantial image distortion.

Figure 2:
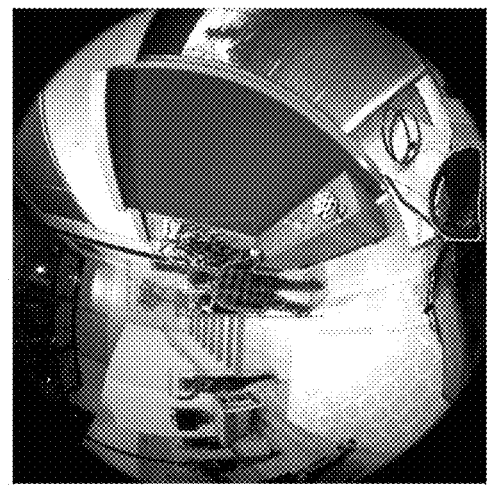
FIG. 2 illustrates example semantic information identified at different stages of a transfer learning process using a curvilinear image.
Figure 2:
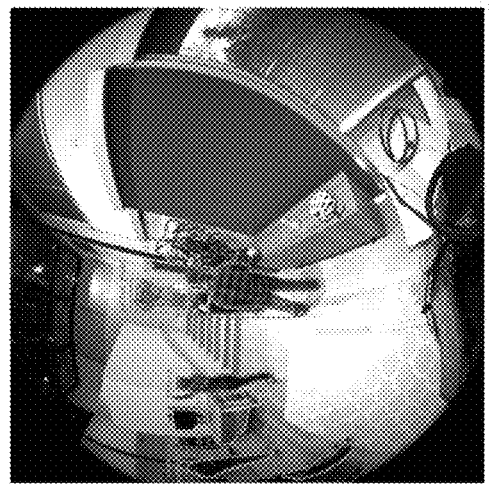
Figure 2:
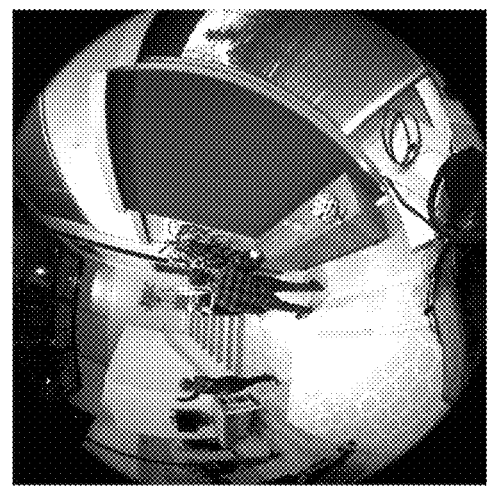
Figure 2:
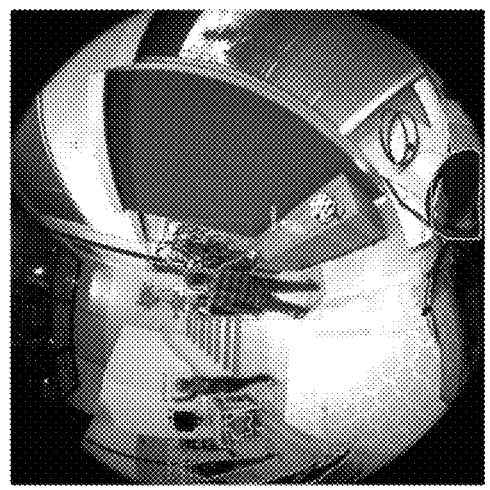

FIG. 2 illustrates example semantic information identified at different stages of a transfer learning process using a particular curvilinear image. Image 210 is a curvilinear gray-scale photograph captured by a fisheye camera lens. Image 220 illustrates semantic information directly identified within curvilinear image 210 by a machine-learning model pre-trained on annotated rectilinear images. Image 230 illustrates a "ground truth" curvilinear image illustrating semantic information identified from curvilinear image 210 based on the transfer learning process disclosed herein. Image 240 illustrates semantic information subsequently identified directly within curvilinear image 210 by the machine-learning model after it is trained with the transfer learning process based on the semantic information identified in image 230. The effects of the disclosed transfer learning process may be observed by comparing the semantic information identified in images 220, 230, and 240. For example, semantic information associated with an object (a potted plant) is recognized in images 220 and 240, but not in image 230. This may be due to the relatively minimal amount of distortion present in the middle of the curvilinear image where the potted plant is located. Since the machine-learning model is pre-trained on rectilinear images having relatively little distortion as opposed to curvilinear images having distortion similar to image 220, the machine-learning model may be best equipped to identify semantic information in the portion of the curvilinear image also having minimal distortion. It may also be observed that the machine-learning model did not identify semantic information associated with several objects (e.g., two people, a dining table, and a television) located further from the center of curvilinear image 220 that the disclosed transfer learning process accurately recognized in the ground truth image 230. As will be described in detail, this may be due to the rectification techniques implemented by the transfer learning process which accounts for the relatively greater distortion of those objects in the curvilinear image. The semantic information identified in image 240 indicates that after being trained by the transfer learning process, the machine-model is able to successfully identify semantic information associated with several objects (e.g., two people, a person's previously unidentified arm, a television, and a dining table) affected by distortion that it was unable to identify beforehand in image 220. Although the trained machine-learning model is unable to identify semantic information associated with several objects (the mouse and the bottle) identified by the transfer learning process in image 230, and despite no longer identifying semantic information associated with an object (the mouse) recognized in image 220, the semantic information identified in image 240 relative to image 220 shows a substantial improvement in the machine-learning model's accuracy. In particular embodiments, the machine-learning model may be trained over multiple iterations of the transfer learning process disclosed herein. In a given iteration of the transfer learning process, the machine-learning model may additionally be trained on ground truth semantic information 230 identified in prior iterations of the transfer learning process. As a result, semantic information 240 identified by the trained machine-learning model may be more accurate than the ground truth semantic information 230 identified during the transfer learning process. Although this disclosure describes implementing a transfer learning process in a particular manner with a particular curvilinear image, this disclosure contemplates implementing a transfer learning process in any suitable manner with any suitable curvilinear image.

Figure 3:
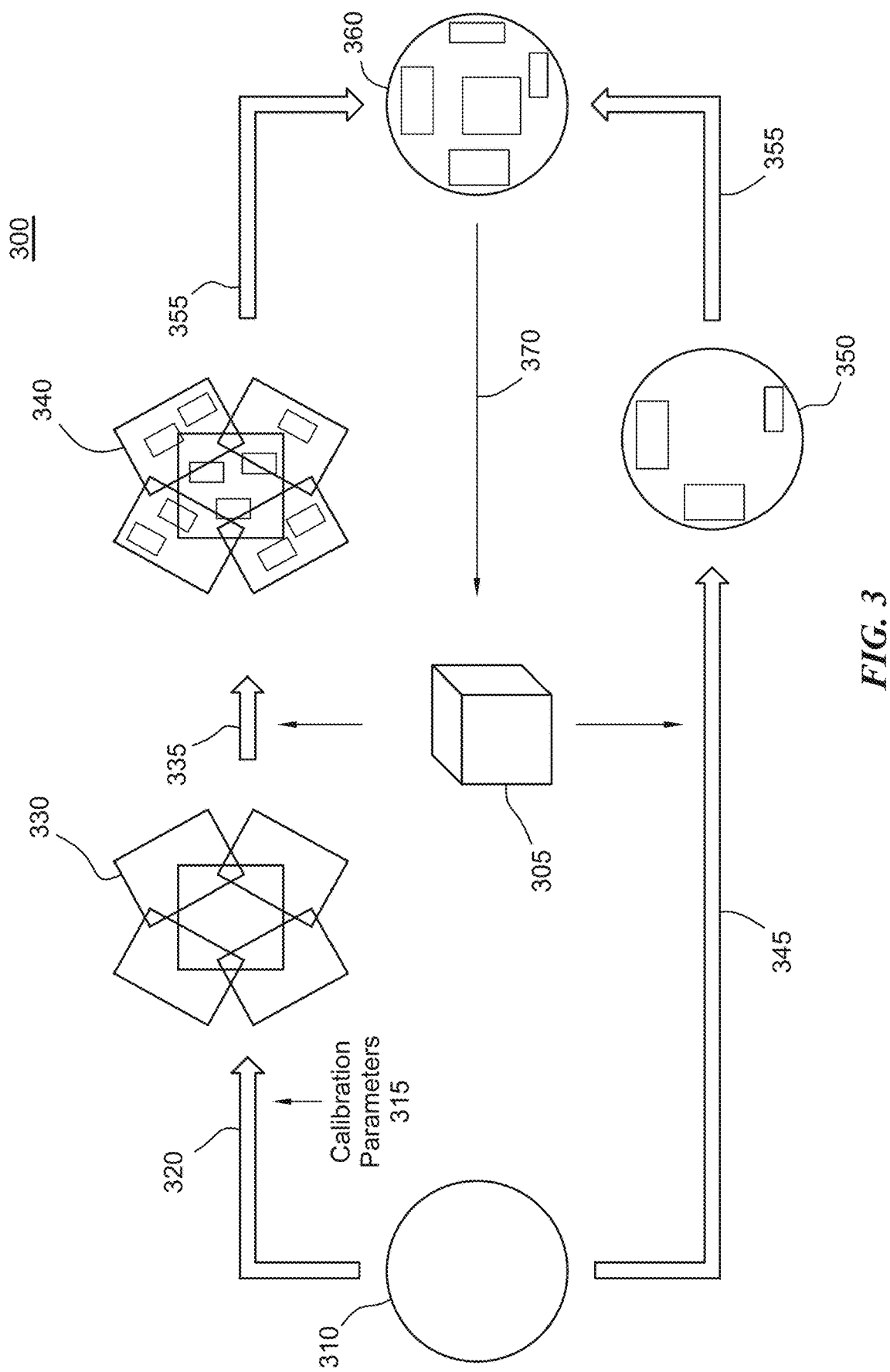
FIG. 3 illustrates an example framework for implementing a transfer learning process using a curvilinear image.

FIG. 3 illustrates an example framework 300 for implementing a transfer learning process using a curvilinear image. In particular embodiments, example framework 300 may be implemented on a computing system configured to access a machine-learning model 305 and a curvilinear image 310. The computing system may be a centralized server configured to communicate with one or more client systems. In alternative embodiments, example framework 300 may be implemented on one or more client systems using particular federated learning techniques. Additional information related to federated learning techniques may be found in U.S. Patent Applications corresponding to Ser. No. 16/815,960 and Ser. No. 16/815,990, each of which is incorporated by reference. In particular embodiments, machine-learning model 305 may be any type of neural network model suitable for performing computer vision tasks. For example, machine-learning model 305 may be a Mask Region with Convolutional Neural Network (Mask R-CNN). In particular embodiments, machine-learning model 305 may have been pre-trained on one or more datasets of annotated rectilinear images to accurately perform computer vision tasks (e.g., object detection and semantic segmentation) on rectilinear images. In particular embodiments, curvilinear image 310 may be a photographic image captured by large FOV camera having calibration parameters 315. In particular embodiments, the large FOV camera may be a hemispheric fisheye camera lens associated with an AR/VR system. Although this disclosure describes a particular framework for implementing a transfer learning process in a particular manner, this disclosure contemplates any suitable framework for implementing a transfer learning process.

In particular embodiments, example framework 300 may begin at step 320 by identifying a plurality of tangent planes corresponding to a plurality of points on the hemisphere of a fisheye camera lens. For each identified tangent plane, example framework 300 may then identify a portion of curvilinear image 310 corresponding to the identified tangent plane. Example framework 300 may then generate a plurality of rectilinear images 340 by rectifying each identified portion of curvilinear image 310 based at least in part on the camera calibration parameters 315, which may enable example framework 300 to account for any distortion present in each identified portion of curvilinear image 310. In particular embodiments, the number of identified tangent planes (e.g., nine tangent planes) may be selected based on a measure of efficiency determined from prior experimentation results, which may consider factors including model accuracy, training duration, and usage of computing resources (e.g., the amount of processing required from client devices in a federated learning setting). Although this disclosure describes generating rectified rectilinear images in a particular manner, this disclosure contemplates generating rectified rectilinear images in any suitable manner.

In particular embodiments, at step 335, example framework 300 may apply machine-learning model 305 to each of the plurality of rectilinear images 330 in order to identify semantic information in each of a plurality of rectilinear images 340. In particular embodiments, at step 345, example framework 300 may also apply machine-learning model 305 to the original curvilinear image 310 in order to directly identify semantic information in curvilinear image 350. In particular embodiments, at steps 355, example framework 300 may implement particular semantic fusion techniques to the semantic information identified in one or more of the rectilinear images 340 and curvilinear image 350 in order to generate a ground truth curvilinear image 360. Additional information related to semantic fusion techniques can be found in U.S. patent application Ser. No. 16/403,421, filed 3 May 2019, which is incorporated by reference. Although this disclosure describes identifying semantic information in a particular manner, this disclosure contemplates identifying semantic information in any suitable manner.

In particular embodiments, one or more portions of each generated rectilinear image 330 may overlap with one or more portions of other rectilinear images 330, such that each overlapping portion corresponds to a particular part of curvilinear image 310. Example framework 300 may utilize the overlapping portions of rectilinear images 340 to improve the accuracy of semantic information identified in rectilinear images 340, curvilinear image 350, and curvilinear image 360. In particular embodiments, example framework 300 may utilize the overlapping portions of rectilinear images 330 to improve the accuracy of pixel-level segmentations. For example, machine-learning model 305 may determine that particular semantic labels have higher confidence scores when they are identified in overlapping portions of multiple rectilinear images 340, which may be particularly beneficial in noisy situations (e.g., portions of curvilinear images having substantial distortion). As another example, machine-learning model 305 may resolve ambiguities for particular semantic labels based on their similarity across overlapping portions of multiple rectilinear images 340. For example, if an object instance associated with a person in a single rectilinear image 340 does not include the person's leg, there may be ambiguity as to whether the leg is not visible in the image or whether the machine-learning model instead failed to identify it. However, if the same object instance is identified without the leg in an overlapping portion of multiple rectilinear images 340, the machine-learning model may determine with greater confidence that there is no ambiguity and that the object instance should not include the person's leg. In particular embodiments, example framework 300 may further utilize the overlapping portions of rectilinear images 340 to improve the accuracy of instance-level segmentations. For example, machine-learning model 305 may identify one or more partial object instances in one or more rectilinear images 340, but may determine, based on the overlapping portions of multiple rectilinear images 340 and the object instances identified in curvilinear image 350, that the partial object instances should be fused into a single object instance. Although this disclosure describes using overlapping portions of rectilinear images in a particular manner, this disclosure contemplates using overlapping portions of rectilinear images in any suitable manner.

In particular embodiments, the ground truth semantic information identified in one or more curvilinear images 360 may be used to train machine-learning model 305 to more accurately identify semantic information directly within curvilinear images. In particular embodiments, the transfer learning process may additionally train the machine-learning model on ground truth semantic information 360 identified in prior iterations of the transfer learning process. As a result, semantic information identified by the trained machine-learning model may be more accurate than the ground truth semantic information identified during the transfer learning process. In particular embodiments, machine-learning model 305 may be trained on ground truth semantic information using a multi-stage training process such as Mask-RCNN. Additional information related to deep learning techniques can be found in U.S. patent application Ser. No. 15/922,734, filed 15 Mar. 2018, U.S. patent application Ser. No. 15/971,930, filed 4 May 2018, U.S. patent application Ser. No. 15/971,997, filed 4 May 2018, U.S. patent application Ser. No. 15/972,035, filed 4 May 2018, U.S. patent application Ser. No. 16/236,877, filed 31 Dec. 2018, and U.S. patent application Ser. No. 16/236,974, filed 31, December 2018, each of which is incorporated by reference. Although this disclosure describes training machine-learning models in a particular manner, this disclosure contemplates training machine-learning models in any suitable manner.

Figure 4A:
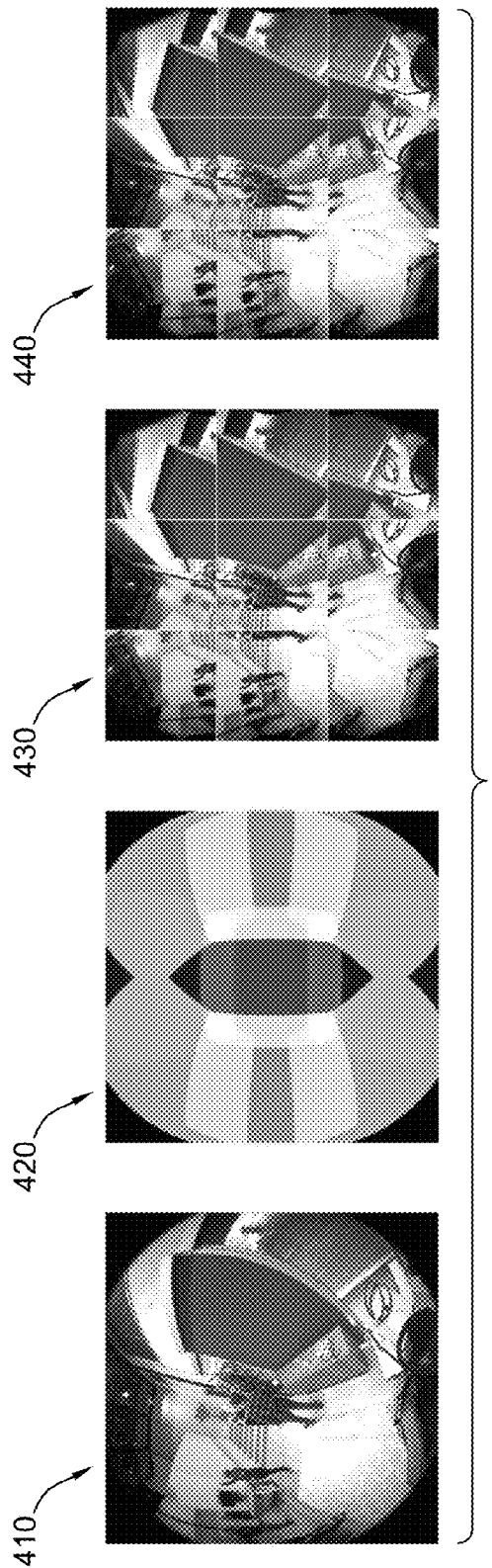
FIGS. 4A & 4B illustrate an example progression of a transfer learning process using a curvilinear image.
Figure 4B:
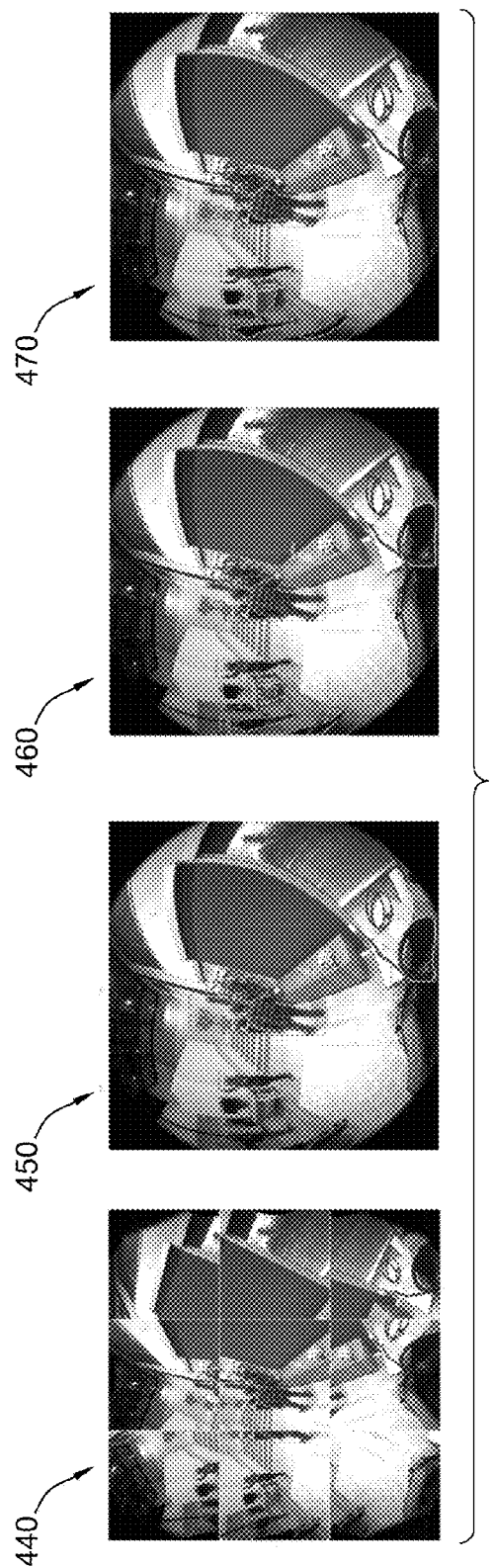

FIGS. 4A & 4B illustrate an example progression of a transfer learning process using a curvilinear image. Referring to FIG. 4A, image 410 illustrates an example curvilinear gray-scale photograph captured by a fisheye camera lens. Images 420 and 430 illustrate an example implementation of step 320 in example framework 300 using curvilinear image 410. In image 420, a plurality of tangent planes corresponding to a plurality of points on the hemisphere of the fisheye camera lens are identified. Specifically, nine tangent planes can be observed in image 420, each of which approximately corresponds to a different region of the hemisphere such that every point on the hemisphere is covered by at least one of the tangent planes. For the purposes of clarity and explanation and not by way of limitation, image 420 identifies the nine tangent planes in color such that the central tangent plane is red, the center-left and center-right tangent planes are green, the upper-center and lower-center tangent planes are blue, and the upper-left, upper-right, lower-left, and lower-right tangent planes are gray. As can be observed in image 420, each of the identified tangent planes partially overlaps with several of the other tangent planes. For example, each of the green tangent planes partially overlaps with the red tangent plane, both of the blue tangent planes, and two of the gray tangent planes. For the purposes of clarity and explanation and not by way of limitation, the overlapping portions in image 420 are colored based on the resulting mixture of the colors of the overlapping tangent planes. For example, the yellow portions illustrate where the red and green tangent planes overlap without any other overlapping tangent planes, while the purple portions illustrate where the red and blue tangent planes overlap without any other overlapping tangent planes. Image 430 illustrates nine rectilinear images generated from curvilinear image 410 corresponding to the nine tangent planes identified in image 420. Each of the rectilinear images is also rectified to account for the distortion in curvilinear image 410 based at least in part on the calibration parameters of the fisheye camera lens as described in step 320 of example framework 300. For example, the edges of the window shown on the right side of curvilinear image 410 are visibly curved, whereas after rectification, the edges of the window shown in each of the three rightmost rectilinear images 430 are relatively straight. The rectified portions of curvilinear image 410 corresponding to the overlapping portions of the tangent planes in image 420 can also be observed in the rectilinear images in image 430. For example, the top half of the person raising their hand is visible in both the top-left rectilinear image and the center-left rectilinear image in image 430. Images 430 and 440 illustrate an example implementation of step 335 in example framework 300. Image 440 illustrates semantic information identified in the rectilinear images of image 430 by a machine-learning model as described in example framework 300. As can be observed in image 440, in some cases, for a given overlapping region described in image 430, semantic information associated with a particular object is identified in each overlapping rectilinear image in image 440. For example, semantic information associated with the aforementioned individual raising their hand is identified in both the top-left rectilinear image and the center-left rectilinear image in image 440. As described in example framework 300, because this semantic information is identified in the overlapping portion of both of the rectilinear images, the machine-learning model may determine that the identified semantic information has a high confidence score.

Referring to FIG. 4B, image 450 illustrates an example implementation of step 345 in example framework 300 using curvilinear image 410 in FIG. 4A. Image 450 illustrates semantic information identified in curvilinear image 410 by the machine-learning model as described in example framework 300. Similar to the example semantic information identified in images 220 and 230 of FIG. 2, significant discrepancies can be observed between the semantic information identified in the rectilinear images of image 440 and the semantic information identified in curvilinear image 450. For example, the machine-learning model identified semantic information is identified for substantially more distinct objects throughout the rectilinear images in image 440 than in curvilinear image 450. Notably, many of the objects for which semantic information was only identified in the rectilinear images are located near the periphery of curvilinear image 450 where there is substantial distortion. Another difference is that the semantic information identified in rectilinear image 440 appears to be more accurate than the semantic information identified in curvilinear image 450. For example, the semantic information associated with the person raising their right hand fails to include the raised hand in curvilinear image 450. Yet another observable difference is that the machine-learning model successfully identifies semantic information for small objects (e.g., the bottle in the center image) in the rectified rectilinear images of image 440, but not in curvilinear image 450 even in areas where there is minimal distortion. Image 460 illustrates an example implementation of step 355 in example framework 300 using a semantic fusion technique on the semantic information identified in the rectilinear images of image 440 and curvilinear image 450 to generate ground truth curvilinear image 460. As can be observed in image 460, the ground truth semantic information resulting from semantic fusion is more accurate than the semantic information identified in either the rectilinear images of image 440 or curvilinear image 450. For example, ground truth image 460 resolves pixel-level segmentation inaccuracies such as the non-inclusion of the person's raised hand in curvilinear image 460. As another example, ground truth image 460 includes semantic information identified only in curvilinear image 460 (e.g., a mouse) or only in the rectilinear images of image 440 (e.g., the table, chair, and bottle). As yet another example, ground truth image 460 accurately fuses the partial and inconsistent segmentation masks for the person wearing a head camera in the center-left and upper-left rectilinear images of image 440. Image 470 illustrates example semantic information directly identified in curvilinear image 410 by the machine-learning model after being trained on the ground truth curvilinear image 460 in step 370 of example framework 300. As can be observed by comparing images 450, 460, and 470, the trained machine-learning model is substantially more accurate in directly identifying semantic information in curvilinear images after going through the transfer learning process. Additional iterations of the transfer learning process will increasingly fine-tune the machine-learning model because the trained model will more accurately identify semantic information in both the rectified rectilinear images 440 and in curvilinear image 450, which in turn will result in a more accurate ground truth image 460 used to train the machine-learning model. In particular embodiments, the transfer learning process may additionally train the machine-learning model on ground truth semantic information 460 identified in prior iterations of the transfer learning process. As a result, semantic information 470 identified by the trained machine-learning model may be more accurate than the ground truth semantic information 460 identified during the transfer learning process.

Figure 5:
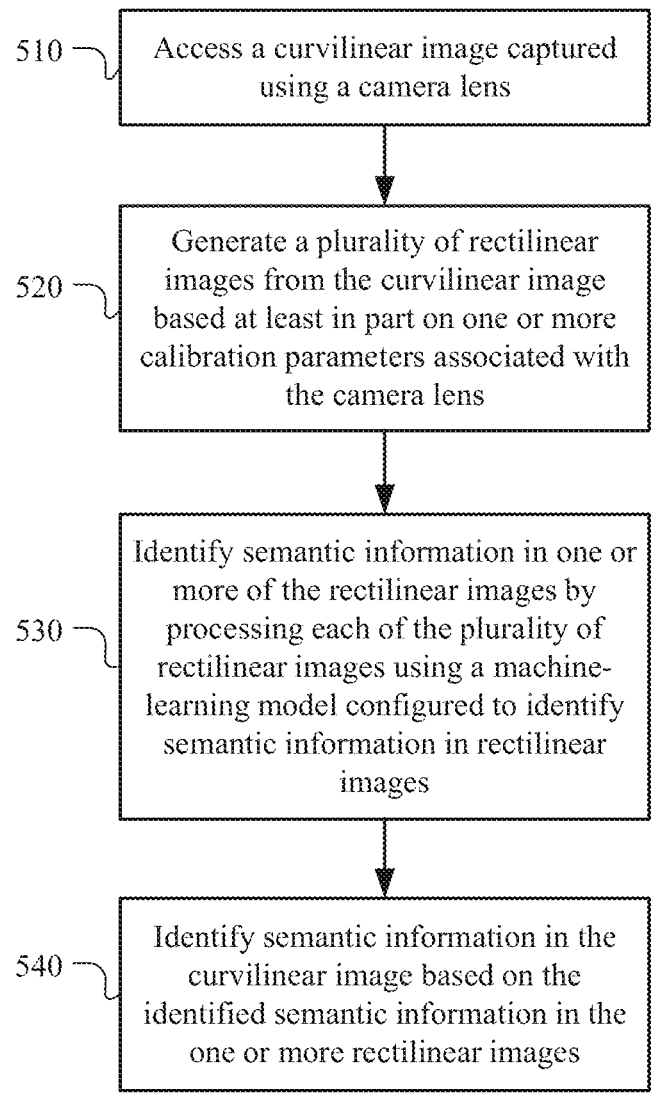
FIG. 5 illustrates an example method for implementing a transfer learning process using a curvilinear image.

FIG. 5 illustrates an example method 500 for implementing a transfer learning process using a curvilinear image. The method may begin at step 510, where a computing system may access a curvilinear image captured using a camera lens. At step 520, the computing system may generate a plurality of rectilinear images from the curvilinear image based at least in part on one or more calibration parameters associated with the camera lens. At step 530, the computing system may identify semantic information in one or more of the rectilinear images by processing each of the plurality of rectilinear images using a machine-learning model configured to identify semantic information in rectilinear images. At step 540, the computing system may identify semantic information in the curvilinear image based on the identified semantic information in the one or more rectilinear images. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for implementing a transfer learning process, including the particular steps of the method of FIG. 5, this disclosure contemplates any suitable method of implementing a transfer learning process, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
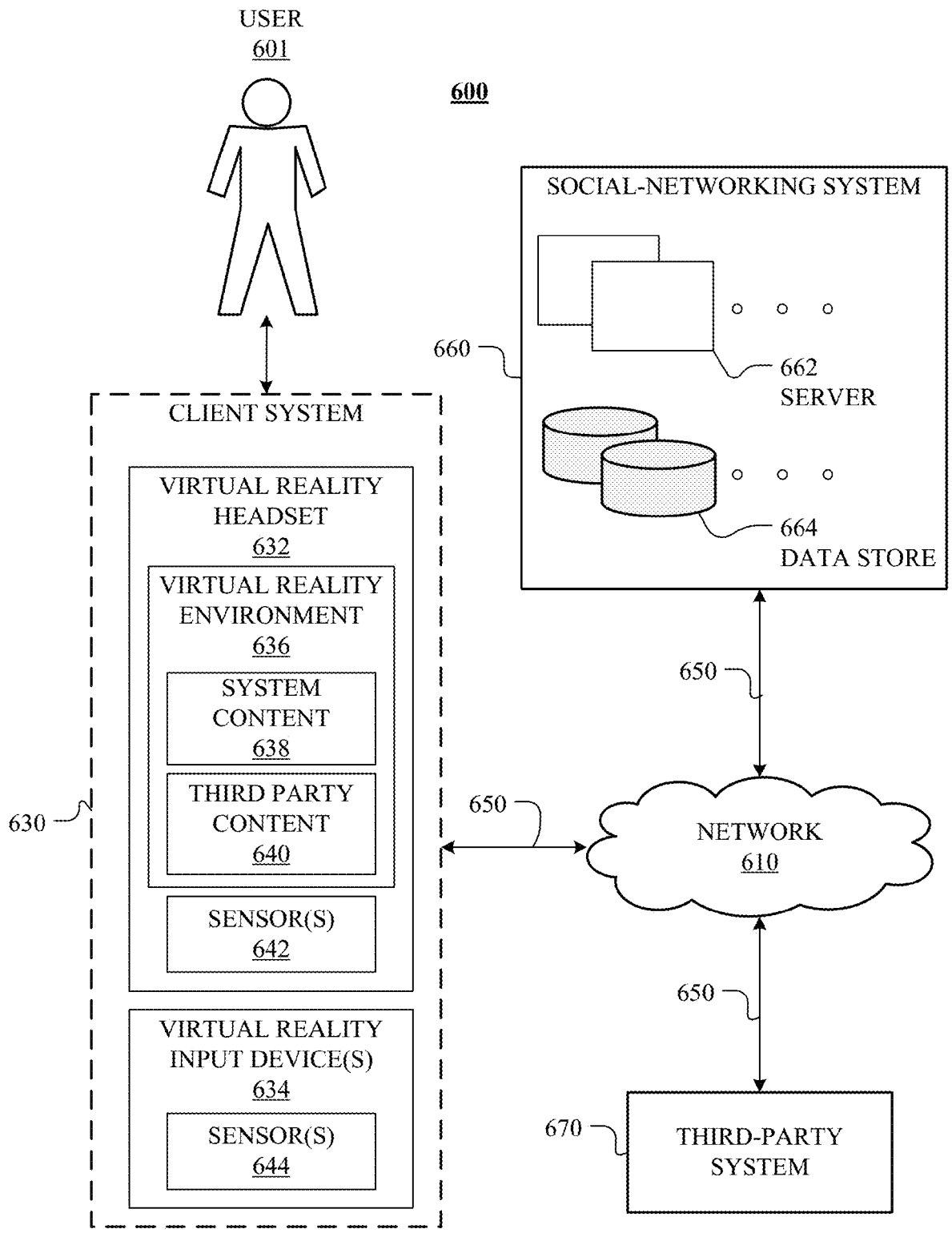
FIG. 6 illustrates an example network environment associated with a virtual reality system.

FIG. 6 illustrates an example network environment 600 associated with a virtual reality system. Network environment 600 includes a user 601 interacting with a client system 630, a social-networking system 660, and a third-party system 670 connected to each other by a network 610. Although FIG. 6 illustrates a particular arrangement of a user 601, a client system 630, a social-networking system 660, a third-party system 670, and a network 610, this disclosure contemplates any suitable arrangement of a user 601, a client system 630, a social-networking system 660, a third-party system 670, and a network 610. As an example and not by way of limitation, two or more of a user 601, a client system 630, a social-networking system 660, and a third-party system 670 may be connected to each other directly, bypassing a network 610. As another example, two or more of a client system 630, a social-networking system 660, and a third-party system 670 may be physically or logically co-located with each other in whole or in part. Moreover, although FIG. 6 illustrates a particular number of users 601, client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple users 601, client systems 630, social-networking systems 660, third-party systems 670, and networks 610.

This disclosure contemplates any suitable network 610. As an example and not by way of limitation, one or more portions of a network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 610 may include one or more networks 610.

Links 650 may connect a client system 630, a social-networking system 660, and a third-party system 670 to a communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout a network environment 600. One or more first links 650 may differ in one or more respects from one or more second links 650.

In particular embodiments, a client system 630 may be an electronic device including hardware, software, or embedded logic components or a combination of two or more such components and capable of carrying out the appropriate functionalities implemented or supported by a client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 630. A client system 630 may enable a network user at a client system 630 to access a network 610. A client system 630 may enable its user to communicate with other users at other client systems 630. A client system 630 may generate a virtual reality environment for a user to interact with content.

In particular embodiments, a client system 630 may include a virtual reality (or augmented reality) headset 632, such as OCULUS RIFT and the like, and virtual reality input device(s) 634, such as a virtual reality controller. A user at a client system 630 may wear the virtual reality headset 632 and use the virtual reality input device(s) to interact with a virtual reality environment 636 generated by the virtual reality headset 632. Although not shown, a client system 630 may also include a separate processing computer and/or any other component of a virtual reality system. A virtual reality headset 632 may generate a virtual reality environment 636, which may include system content 638 (including but not limited to the operating system), such as software or firmware updates and also include third-party content 640, such as content from applications or dynamically downloaded from the Internet (e.g., web page content). A virtual reality headset 632 may include sensor(s) 642, such as accelerometers, gyroscopes, magnetometers to generate sensor data that tracks the location of the headset device 632. The headset 632 may also include eye trackers for tracking the position of the user's eyes or their viewing directions. The client system may use data from the sensor(s) 642 to determine velocity, orientation, and gravitation forces with respect to the headset. Virtual reality input device(s) 634 may include sensor(s) 644, such as accelerometers, gyroscopes, magnetometers, and touch sensors to generate sensor data that tracks the location of the input device 634 and the positions of the user's fingers. The client system 630 may make use of outside-in tracking, in which a tracking camera (not shown) is placed external to the virtual reality headset 632 and within the line of sight of the virtual reality headset 632. In outside-in tracking, the tracking camera may track the location of the virtual reality headset 632 (e.g., by tracking one or more infrared LED markers on the virtual reality headset 632). Alternatively or additionally, the client system 630 may make use of inside-out tracking, in which a tracking camera (not shown) may be placed on or within the virtual reality headset 632 itself. In inside-out tracking, the tracking camera may capture images around it in the real world and may use the changing perspectives of the real world to determine its own position in space.

Third-party content 640 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 630 may enter a Uniform Resource Locator (URL) or other address directing a web browser to a particular server (such as server 662, or a server associated with a third-party system 670), and the web browser may generate a Hyper Text Transfer Protocol (HTTP) request and communicate the HTTP request to server. The server may accept the HTTP request and communicate to a client system 630 one or more Hyper Text Markup Language (HTML) files responsive to the HTTP request. The client system 630 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 660 may be a network-addressable computing system that can host an online social network. The social-networking system 660 may generate, store, receive, and send social-networking data, such as, for example, user-profile data, concept-profile data, social-graph information, or other suitable data related to the online social network. The social-networking system 660 may be accessed by the other components of network environment 600 either directly or via a network 610. As an example and not by way of limitation, a client system 630 may access the social-networking system 660 using a web browser of a third-party content 640, or a native application associated with the social-networking system 660 (e.g., a mobile social-networking application, a messaging application, another suitable application, or any combination thereof) either directly or via a network 610. In particular embodiments, the social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, the social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, the social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. The social-networking system 660 may provide users of the online social network the ability to communicate and interact with other users. In particular embodiments, users may join the online social network via the social-networking system 660 and then add connections (e.g., relationships) to a number of other users of the social-networking system 660 whom they want to be connected to. Herein, the term "friend" may refer to any other user of the social-networking system 660 with whom a user has formed a connection, association, or relationship via the social-networking system 660.

In particular embodiments, the social-networking system 660 may provide users with the ability to take actions on various types of items or objects, supported by the social-networking system 660. As an example and not by way of limitation, the items and objects may include groups or social networks to which users of the social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 660 or by an external system of a third-party system 660, which is separate from the social-networking system 660 and coupled to the social-networking system 660 via a network 610.

In particular embodiments, the social-networking system 660 may be capable of linking a variety of entities. As an example and not by way of limitation, the social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating the social-networking system 660. In particular embodiments, however, the social-networking system 660 and third-party systems 670 may operate in conjunction with each other to provide social-networking services to users of the social-networking system 660 or third-party systems 670. In this sense, the social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 660 also includes user-generated content objects, which may enhance a user's interactions with the social-networking system 660. User-generated content may include anything a user can add, upload, send, or "post" to the social-networking system 660. As an example and not by way of limitation, a user communicates posts to the social-networking system 660 from a client system 630. Posts may include data such as status updates or other textual data, location information, photos, videos, links, music or other similar data or media. Content may also be added to the social-networking system 660 by a third-party through a "communication channel," such as a newsfeed or stream.

In particular embodiments, the social-networking system 660 may include a variety of servers, sub-systems, programs, modules, logs, and data stores. In particular embodiments, the social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 660 may also include suitable components such as network interfaces, security mechanisms, load balancers, failover servers, management-and-network-operations consoles, other suitable components, or any suitable combination thereof. In particular embodiments, the social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 660 to one or more client systems 630 or one or more third-party systems 670 via a network 610. The web server may include a mail server or other messaging functionality for receiving and routing messages between the social-networking system 660 and one or more client systems 630. An API-request server may allow a third-party system 670 to access information from the social-networking system 660 by calling one or more APIs. An action logger may be used to receive communications from a web server about a user's actions on or off the social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from a client system 630 responsive to a request received from a client system 630. Authorization servers may be used to enforce one or more privacy settings of the users of the social-networking system 660. A privacy setting of a user determines how particular information associated with a user can be shared. The authorization server may allow users to opt in to or opt out of having their actions logged by the social-networking system 660 or shared with other systems (e.g., a third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
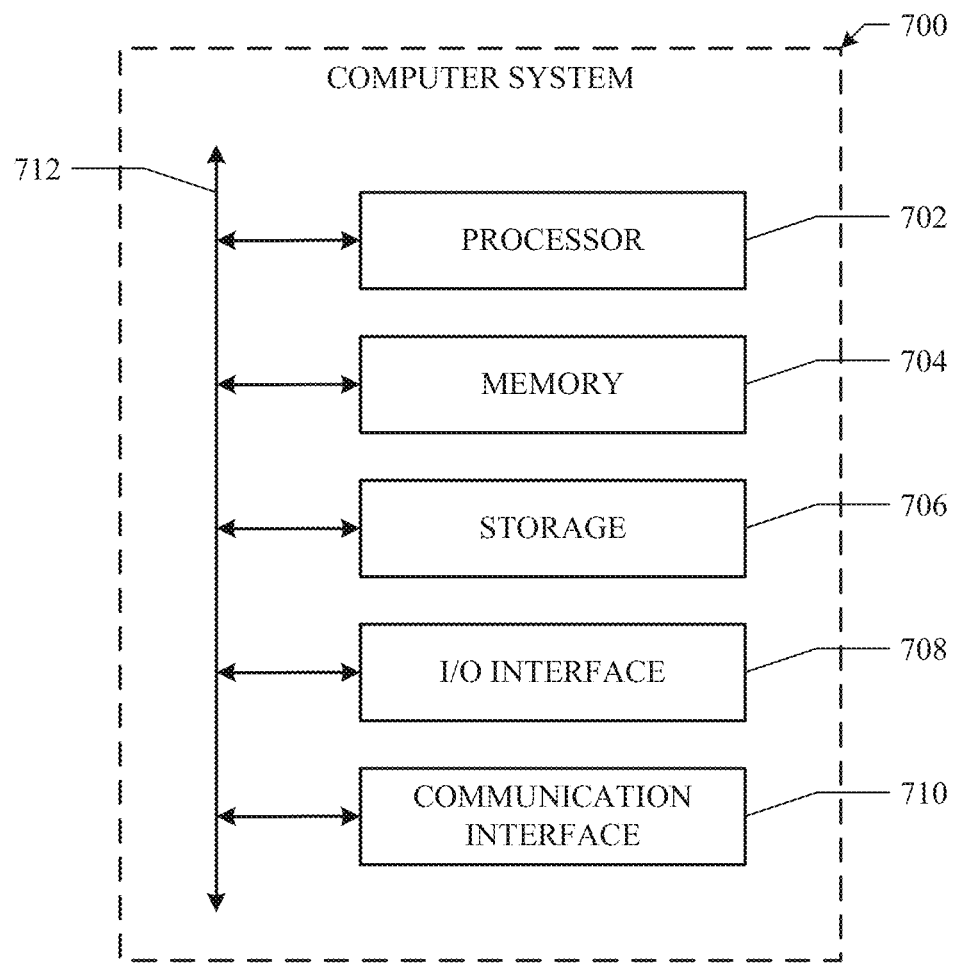
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a curvilinear image captured using a camera lens;
generating a plurality of rectilinear images from the curvilinear image based at least in part on one or more calibration parameters associated with the camera lens;
identifying a plurality of sets of rectilinear semantic information in the plurality of rectilinear images, respectively, by processing each of the plurality of rectilinear images using a machine-learning model, wherein the machine-learning model is configured to identify semantic information in rectilinear images and in curvilinear images;
identifying a set of curvilinear semantic information in the curvilinear image by processing the curvilinear image using the machine-learning model; and
generating a set of ground truth semantic information in the curvilinear image based on the identified set of curvilinear semantic information and the plurality of sets of rectilinear semantic information.

2. The method of claim 1, wherein generating the plurality of rectilinear images from the curvilinear image comprises:
identifying a plurality of tangent planes based on a respective plurality of sample points in the curvilinear image;
identifying, for each of the plurality of tangent planes, a portion of the curvilinear image corresponding to the tangent plane based on the associated sample point; and
generating, for each of the plurality of tangent planes, a rectilinear image by rectifying the corresponding portion of the curvilinear image based on the one or more calibration parameters.

3. The method of claim 2, wherein each identified portion of the curvilinear image overlaps with one or more other identified portions of the curvilinear image.

4. The method of claim 1, wherein identifying the ground truth semantic information in the curvilinear image comprises applying a semantic fusion algorithm to the identified rectilinear and curvilinear semantic information.

5. The method of claim 1, wherein the identified curvilinear semantic information is used to resolve one or more inconsistencies in the identified rectilinear semantic information for one or more of the rectilinear images.

6. The method of claim 1, further comprising training the machine-learning model to identify semantic information in curvilinear images with increased accuracy based on the generated ground truth semantic information.

7. The method of claim 1, wherein the rectilinear and curvilinear semantic information comprise one or more segmentations that identify objects of interest.

8. The method of claim 7, wherein the one or more segmentations comprise one or more of geometry-based segmentations, instance segmentations, or semantic segmentations.

9. The method of claim 1, wherein the camera lens is a fisheye lens.

10. A system comprising: one or more processors; and a memory coupled to the processors comprising instructions executable by the processors, the processors operable when executing the instructions to:
  access a curvilinear image captured using a camera lens;
  generate a plurality of rectilinear images from the curvilinear image based at least in part on one or more calibration parameters associated with the camera lens;
  identify a plurality of sets of rectilinear semantic information in the plurality of rectilinear images, respectively, by processing each of the plurality of rectilinear images using a machine-learning model, wherein the machine-learning model is configured to identify semantic information in rectilinear images and in curvilinear images;
  identify a set of curvilinear semantic information in the curvilinear image by processing the curvilinear image using the machine-learning model; and
  generate a set of ground truth semantic information in the curvilinear image based on the identified set of curvilinear semantic information and the plurality of sets of rectilinear semantic information.

11. The system of claim 10, wherein the processors are further operable when executing the instructions to:
  identify a plurality of tangent planes based on a respective plurality of sample points in the curvilinear image;
  identify, for each of the plurality of tangent planes, a portion of the curvilinear image corresponding to the tangent plane based on the associated sample point; and
  generate, for each of the plurality of tangent planes, a rectilinear image by rectifying the corresponding portion of the curvilinear image based on the one or more calibration parameters.

12. The system of claim 11, wherein each identified portion of the curvilinear image overlaps with one or more other identified portions of the curvilinear image.

13. The system of claim 10, wherein the processors are further operable when executing the instructions to train the machine-learning model to identify semantic information in curvilinear images with increased accuracy based on the generated ground truth semantic information.

14. One or more computer-readable non-transitory storage media embodying software that is operable when executed to:
  access a curvilinear image captured using a camera lens;
  generate a plurality of rectilinear images from the curvilinear image based at least in part on one or more calibration parameters associated with the camera lens;
  identify a plurality of sets of rectilinear semantic information in the plurality of rectilinear images, respectively, by processing each of the plurality of rectilinear images using a machine-learning model, wherein the machine-learning model is configured to identify semantic information in rectilinear images and in curvilinear images;
  identify a set of curvilinear semantic information in the curvilinear image by processing the curvilinear image using the machine-learning model; and
  generate a set of ground truth semantic information in the curvilinear image based on the identified set of curvilinear semantic information and the plurality of sets of rectilinear semantic information.

15. The media of claim 14, wherein the software is further operable when executed to:
  identify a plurality of tangent planes based on a respective plurality of sample points in the curvilinear image;
  identify, for each of the plurality of tangent planes, a portion of the curvilinear image corresponding to the tangent plane based on the associated sample point; and
  generate, for each of the plurality of tangent planes, a rectilinear image by rectifying the corresponding portion of the curvilinear image based on the one or more calibration parameters.

16. The media of claim 15, wherein each identified portion of the curvilinear image overlaps with one or more other identified portions of the curvilinear image.

17. The media of claim 14, wherein the software is further operable when executed to train the machine-learning model to train the machine-learning model to identify semantic information in curvilinear images with increased accuracy based on the generated ground truth semantic information.

* * * * *